United States Patent Office 3,594,445
Patented July 20, 1971

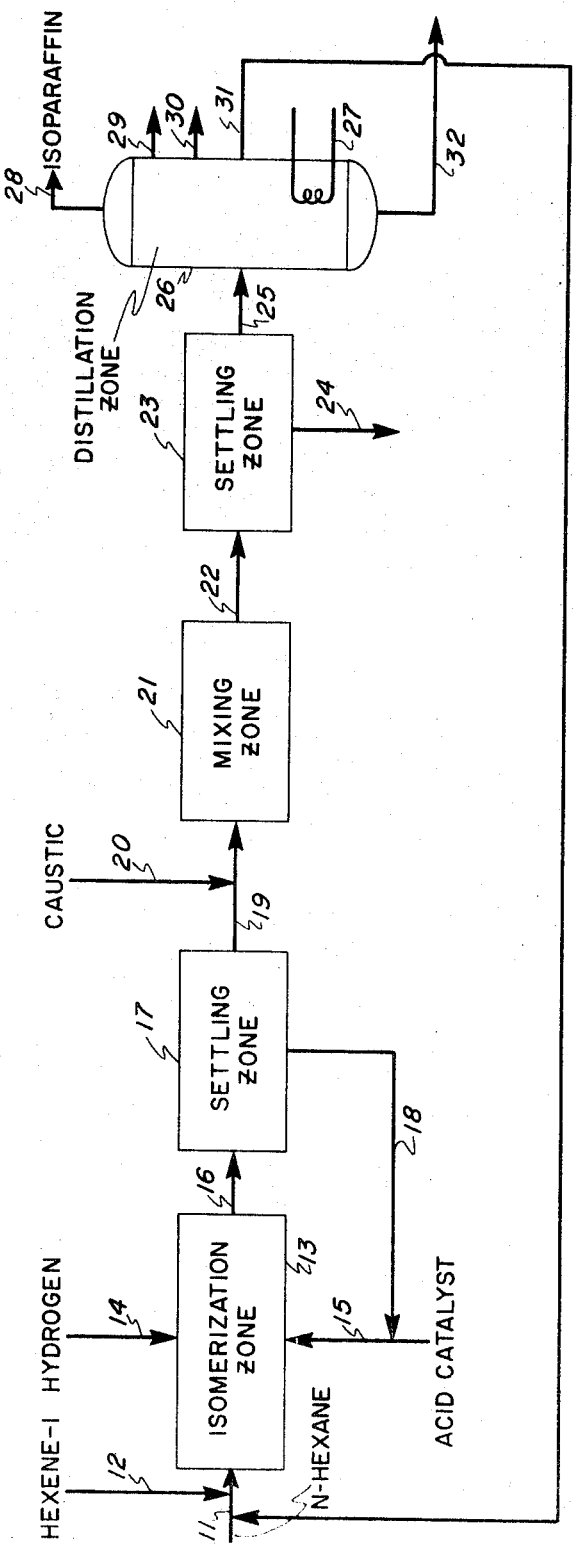

3,594,445
ISOMERIZATION OF PARAFFINIC HYDROCARBONS EMPLOYING HYDROGEN WITH AN OLEFIN AND/OR AN ALKYL FLUOROSULFONATE
Paul Thomas Parker, Baton Rouge, La., assignor to Esso Research and Engineering Company
Filed Oct. 30, 1969, Ser. No. 872,687
Int. Cl. C07c 5/28
U.S. Cl. 260—683.68                                    10 Claims

ABSTRACT OF THE DISCLOSURE

In the isomerization of normal and naphthenic paraffins with a catalyst comprised of (1) a Group V metal fluoride such as antimony pentafluoride and (2) fluorosulfonic acid, the improvement wherein the formation of undesirable products by disproportionation is suppressed by employing hydrogen gas with an olefin and/or an alkyl fluorosulfonate such as ethyl fluorosulfonate.

BACKGROUND OF THE INVENTION

Field of the invention

The present invention relates to an improved method for isomerizing normal and naphthenic paraffins. More particularly, the invention is concerned with an isomerization process utilizing a strong acid catalyst wherein the formation of undesirable side products is minimized by carrying out the reaction in the presence of (1) hydrogen and (2) an olefin and/or alkyl fluorosulfonate.

Description of the prior art

It is well known that the more highly branched isomers of the paraffinic hydrocarbons occurring in petroleum gasoline fractions are more valuable than the corresponding slightly branched or straight chain hydrocarbons because of their higher octane ratings. The demand for motor fuels of greater octane number has increased markedly as the automotive industry has provided gasoline engines with increasingly higher compression ratios to attain greater efficiency. One of the economically important ways in which the increased demands for high octane fuels can be met is through the isomerization of the light naphtha components of such fuels.

It may be generally stated that the isoparaffinic and branched chain paraffin hydrocarbons are of greater commercial value to the petroleum industry than the corresponding straight chain hydrocarbons. Thus, for example, 2,2-dimethylbutane has a higher octane rating than the isomeric normal hexane. Isobutane is more valuable than normal butane since the former can be used as the basis for the preparation of 8-carbon-atom branched chain hydrocarbons by alkylation with butylene.

The isomerization of normal and naphthenic paraffin hydrocarbons into the corresponding branched chain homologs is well known. For effecting the isomerization, it is customary to employ certain metal halides, particularly aluminum chloride or aluminum bromide, in conjunction with certain promoters, such as hydrogen chloride, hydrogen bromide or boron fluoride. Recently, strong acid systems such as solutions of fluorosulfonic acid and antimony pentafluoride have also been disclosed as useful isomerization catalysts.

An important problem arising with the use of these highly active catalysts is that they promote side reactions, such as cracking and disproportionation. These side reactions are particularly evident at high conversion conditions and lead to the formation of substantial amounts of undesirable light and/or heavy side products.

SUMMARY OF THE INVENTION

In accordance with the invention, the formation of undesirable side products in the isomerization of normal and naphthenic paraffins in the presence of a metal fluoride-fluorosulfonic acid catalyst system is substantially reduced by conducting the reaction in the presence of (1) hydrogen and (2) an olefin and/or an alkyl fluorosulfonate.

The catalyst composition used in the process of the invention comprises fluorosulfonic acid and a metal fluoride wherein said metal is selected from Group V of the Periodic Table such as antimony, arsenic, tantalum and niobium. The Periodic Table referred to is that described in "The Encyclopedia of Chemistry," Reinhold Publishing Corporation, 2nd edition (1966) at page 790. Specific examples of these metal fluorides include antimony pentafluoride, arsenic pentafluoride, tantalum pentafluoride, niobium pentafluoride and the like. The catalyst composition is generally an equimolar mixture of the metal fluoride and fluorosulfonic acid. However, where a more fluid catalyst composition is desired, it will be convenient to use larger relative amounts of the fluorosulfonic acid which may function as a solvent. Accordingly, the catalyst composition may contain 1 to 3 or more moles of fluorosulfonic acid to 1 mole of the metal fluoride catalyst component.

The reaction is conducted in the presence of hydrogen in an amount ranging from about 15 to about 5,000 pounds per square inch absolute (p.s.i.a.) of hydrogen partial pressure. Preferably, a hydrogen partial pressure of 100 to 400 p.s.i.a. will be used.

The olefins which are added to the reaction zone include the $C_2$ to $C_8$ monoolefins such as ethylene, propylene, 1-butene, 2-pentene, 1-hexene, 1-octene, and the like.

The alkyl fluorosulfonates which are added to the reaction zone include the $C_2$ to $C_8$ alkyl fluorosulfonates such as ethyl fluorosulfonate, butyl fluorosulfonate, pentyl fluorosulfonate, heptyl fluorosulfonate and the like.

Suitable feeds for the purposes of the present invention will contain normal paraffinic hydrocarbons or naphthenic hydrocarbons or mixtures thereof. The normal paraffinic hydrocarbons will suitably have about 4 to 8 carbon atoms in the molecule and may be exemplified by normal pentane, normal hexane, normal heptane, n-octane and the like. While the feed may substantially comprise a purified normal paraffinic hydrocarbon stream, it is also contemplated that mixtures of various paraffinic hydrocarbons be employed, and that other aliphatic or alicyclic hydrocarbons commonly found in conventional petroleum hydrocarbon light naphtha streams may be present. Additionally, the feed stream can contain both paraffinic and naphthenic hydrocarbons. Thus, the feed stream can also substantially comprise a $C_6$ to $C_8$ naphthenic hydrocarbon or mixture of various naphthenic hydrocarbons. Typical examples of naphthenic hydrocarbons which can be successfully isomerized in accordance with the present invention include cyclohexane, cycloheptane, cyclooctane, etc., and their alkyl derivatives, such as methylcyclohexane, methylcyclopentane, ethylcyclohexane, dimethylcyclopentane, etc.

The feed to be isomerized may contain a conventional isomerization promoter such as hydrogen chloride, tertiary chlorobutane, hydrogen bromide, and the like. The feed may also contain various cracking inhibitors such as cyclohexane, methylcyclopentane, methylcyclohexane, and the like.

The amount of the metal fluoride-fluorosulfonic acid catalyst contacted with the feed may range from 0.05 to 1 part by weight of the catalyst to 1 part by weight of the isomerable portion of the feed, i.e., $C_4$ to $C_8$ normal and/or $C_4$ to $C_8$ naphthenic paraffin. Preferably, the amount of the catalyst will range from 0.15 to 0.5 part by weight to 1 part by weight of the isomerable portion of the feed.

The amount of olefin and/or alkyl fluorosulfonate which is introduced into the reaction zone will range from about 0.1 to 4, preferably 0.25 to 1.5, moles per mole of metal fluoride employed as a catalyst component.

The process of the invention is conducted as a batch or continuous operation. The apparatus employed may be of a conventional nature and may comprise a single reactor equipped with efficient stirring devices, such as mechanical agitator, jets of restricted internal diameter, turbo mixers, etc. Unreacted reactants, catalysts, promoters, inhibitors and heavier products of the reaction may be separated from the desired isomeric product and from one another such as by distillation and returned in whole or in part to the isomerization zone. The resultant product may be further processed as by alkylation and the like, or be employed directly as a high octane gasoline blending agent.

The reaction conditions for isomerization of the feed may be in the range of 0° C. to 100° C., usually 20° C. to 30° C., an pressures ranging between atmospheric and 5,000 p.s.i.a. In general, it will be preferable to maintain the hydrocarbon reactants and cataylsts as liquids in the reaction zone and the temperatures and pressures should be chosen accordingly. The time of contact is subject to wide variation, the length of residence being dependent in part upon the temperature and catalyst concentration employed. In general, contact times between about 30 minutes and 4 hours, usually 1 to 3 hours are employed.

BRIEF DESCRIPTION OF THE DRAWING

The drawing is a flow diagram of a preferred embodiment of the invention. In this connection, the invention will be particularly described with reference to the isomerization of normal hexane in the presence of antimony pentafluoride-fluorosulfonic acid as catalyst. It is not intended, however, that the invention be limited to this particular isomerization reaction.

Referring now to the drawing in detail, numeral 11 designates a charge line by way of which a hydrocarbon feed such as normal hexane is introduced into the system from a source not shown. Admixed with the normal hexane feed in line 11 is 1-hexene introduced by line 12 from a source not shown. The mixture of the normal paraffin and olefin is then charged into an isomerization zone 13. Hydrogen and an acid catalyst such as a mixture containing equimolar proportions of antimony pentafluoride and fluorosulfonic acid are introduced into zone 13 via lines 14 and 15, respectively.

The isomerized product is discharged from zone 13 by line 16 and sent to settling zone 17 wherein there is formed a hydrocarbon phase and an inorganic phase containing the acid catalyst which is essenitally insoluble in the hydrocarbon phase. The separated acid catalyst in zone 17 is then introduced into line 15 via line 18 for reuse in the isomerization zone. The separated hydrocarbon phase is then discharged from settling zone 17 by means of line 19 and contacted therein with caustic (e.g. 20% sodium hydroxide) which is introduced into line 19 via line 20 and intimately mixed therewith in mixing zone 21. The hydrocarbon-caustic mixture is withdrawn from the mixing zone by means of line 22 which introduces the mixture into settling zone 23 wherein the caustic phase is permitted to separate from the hydrocarbon phase. The caustic phase and the hydrocarbon phase are withdrawn from the settling zone via lines 24 and 25, respectively.

The hydrocarbon product from zone 23 is introduced into a separation zone 26 illustrated as a distillation zone which is provided with a heating means such as illustrated by steam coil 27 and with lines 28, 29, 30, 31 and 32. Conditions of temperature and pressure are adjusted in zone 26 to recover the isoparaffins either in one fraction by line 28 or in several fractions by lines 29 and 30 while unreacted normal hexane feed may be discharged by line 31 and preferably recycled to the isomerization zone via lines 31 and 11. The heavy side products are discharged from this system through line 32.

The invention will be further understood by reference to the following examples which include a preferred embodiment of the invention.

DESCRIPTION OF THE PREFERRED EMBODIMENTS

Example 1

A number of isomerization reactions were performed in a batch-wise manner using a stirred 300 cc. Hastelloy C, glass-lined autoclave. The proportions of the starting materials, the reaction conditions employed and the analysis of the products obtained are given in the following table.

ISOMERIZATION OF NORMAL HEXANE WITH ANTIMONY PENTAFLUORIDE-FLUOROSULFONIC ACID CATALYST

|  | Run A | Run B | Run C | Run D | Run E | Run F |
|---|---|---|---|---|---|---|
| Reaction conditions: |  |  |  |  |  |  |
| Amount of n-hexane, cc | 50 | 75 | 50 | 75 | 50 | 50 |
| Amount of $HSO_4F$-$SbF_5$ catalyst, cc.[1] | 2 | 4 | 5 | 5 | 5 | 4 |
| Olefin or hydrocarbyl halosulfonate present | None | None | Ethylene | Ethylene | Hexene-1 | $C_2H_5OSO_2F$ |
| Amount of olefin or hydrocarbylfluorosulfonate, cc. or l.[2] |  |  | 1.8 l | 2.4 l | 1 cc | 1 cc. |
| Reaction temperature, ° F | 80 | 78 | 80 | 78 | 80 | 78 |
| Reaction time, hours | 3.0 | 3.5 | 1.0 | 1.25 | 1.25 | 2 |
| Hydrogen pressure, p.s.i.g. | None | [3]1,000 | None | [3]1,000 | [3]1,000 | [3]100 |
| Product analysis, wt. percent: |  |  |  |  |  |  |
| $C_2$ to $C_4$ fraction | 13.49 | 0.27 | 26.37 | 6.16 | 5.43 | 0.55 |
| Isopentane | 13.06 | 0.08 | 16.32 | 1.52 | 0.22 | 0.10 |
| n-Pentane | 2.48 | 0.01 | 2.10 | 0.30 | 0.19 | 0.08 |
| 2,2-dimethyl butane | 24.76 | 3.00 | 5.74 | 11.40 | 10.19 | 17.82 |
| 2,3-dimethyl butane | 9.13 | 10.90 | 9.76 | 27.11 | 37.83 | 32.01 |
| 2-methylpentane + 3-methylpentane | 3.07 | 4.15 | 3.18 | 9.31 | 12.44 | 10.70 |
| n-Hexane | 16.39 | 81.19 | 24.30 | 43.46 | 30.73 | 37.94 |
| Heptanes | 10.05 | 0.34 | 7.06 | 0.27 | 0.92 | 0.46 |
| $C_{8+}$ | 7.53 | 0.06 | 5.17 | 0.47 | 2.05 | 0.3 4 |
| Products in $C_2$-$C_4$ and $C_7$-$C_{7+}$ range, wt. percent on converted hexane. | 37.2 | 3.7 | 51.0 | 12.4 | 12.1 | 2.2 |

[1] Catalyst consists of equal molar proportions of $HSO_3F$ and $SbF_5$.
[2] Amount of liquid given in cubic centimeters (cc.) and amount of gas given in liters (l.) at 0° C. and 760 mm. Hg.
[3] Includes the partial pressure of the reactants; reactions employing no hydrogen were run at 1 atmosphere pressure.

Referring to the above Table, it is seen that both the presence of hydrogen and an olefin or hydrocarbyl halosulfonate was necessary to suppress the formation of undesirable side products. For example, a substantially higher conversion of normal hexane feed to undesirable products in the $C_2$ to $C_4$ and $C_7$ to $C_{7+}$ range was produced in Run A which employed no hydrogen or olefin compared to Runs D, E and F which employed hydrogen and either an olefin or hydrocarbyl ester of fluorosulfonic acid. Run B shows that hydrogen alone suppresses the formation of disproportion products, but drastically inhibits the isomerization reaction. Run C illustrates that the presence of an olefin without the presence of hydrogen produces a substantial proportion of undesirable light and heavy side products.

It is to be understood that the examples presented herein are intended to merely be illustrative of the invention and not as limiting it in any manner; nor is the invention to be limited by any theory regarding its operability. The scope of the invention is to be determined by the appended claims.

What is claimed is:
1. In a process for isomerizing paraffinic and naphthenic hydrocarbons by contacting said hydrocarbons in a conversion zone with a catalyst comprising a Group V metal fluoride and fluorosulfonic acid, the improvement which comprises introducing into said conversion zone (1) hydrogen and (2) a $C_2$–$C_8$ olefin and/or a $C_2$–$C_8$ alkyl fluorosulfonate.

2. A process as defined in claim 1, wherein said catalyst comprises antimony pentafluoride and fluorosulfonic acid.

3. In a process as defined in claim 2, the improvement wherein said component (2) is a $C_2$–$C_8$ olefin.

4. In a process as defined in claim 2, the improvement wherein said component (2) is ethyl fluorosulfonate.

5. In a process for isomerizing paraffinic and naphthenic hydrocarbons by contacting said hydrocarbons in an isomerization zone with a catalyst comprising a Group V metal fluoride and fluorosulfonic acid, the improvement which comprises introducing into said zone a compound selected from the group consisting of $C_2$–$C_8$ olefins, $C_2$–$C_8$ alkyl fluorosulfonates, and mixtures thereof, and maintaining hydrogen in said zone at a hydrogen partial pressure ranging from 15 to 5000 p.s.i.a.

6. A process as defined in claim 5, wherein said metal fluoride is antimony pentafluoride.

7. In a process as defined in claim 6, the improvement wherein said hydrogen partial pressure is in the range of 100 to 400 p.s.i.a.

8. In a process as defined in claim 7, the improvement wherein said compound is a $C_2$–$C_8$ olefin.

9. A process as defined in claim 8, wherein said compound is hexene-1.

10. In a process as defined in claim 9, the improvement wherein said compound is ethylfluorosulfonate.

References Cited

UNITED STATES PATENTS

| | | | |
|---|---|---|---|
| 2,356,190 | 8/1944 | Voorhies | 260—683.76 |
| 2,411,054 | 10/1946 | Pevere | 260—683.76 |
| 2,423,045 | 6/1947 | Passino | 260—683.68 |
| 2,425,268 | 8/1947 | Sensel | 260—683.76 |
| 2,475,358 | 7/1949 | Moore et al. | 260—683.75 |

DELBERT E. GANTZ, Primary Examiner

G. J. CRASANAKIS, Assistant Examiner